(12) United States Patent
Chen et al.

(10) Patent No.: US 11,415,841 B2
(45) Date of Patent: Aug. 16, 2022

(54) TUNABLE LIGHT PROJECTOR AND LIGHT CONTROL ELEMENT

(71) Applicant: LIQXTAL TECHNOLOGY INC., Tainan (TW)

(72) Inventors: Hung-Shan Chen, Tainan (TW); Chia-Hui Wu, Tainan (TW); Chih-Chan Lin, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 17/110,297

(22) Filed: Dec. 3, 2020

(65) Prior Publication Data

US 2022/0179266 A1    Jun. 9, 2022

(51) Int. Cl.
G02F 1/1343 (2006.01)
G02F 1/1339 (2006.01)
G02F 1/1347 (2006.01)
G03B 21/00 (2006.01)

(52) U.S. Cl.
CPC ...... *G02F 1/134309* (2013.01); *G02F 1/1339* (2013.01); *G02F 1/1347* (2013.01); *G03B 21/006* (2013.01)

(58) Field of Classification Search
CPC ............. G02F 1/134309; G02F 1/1339; G02F 1/1347; G03B 21/006
See application file for complete search history.

(56) References Cited

U.S. PATENT DOCUMENTS

2017/0343873 A1    11/2017  Ma
2018/0035541 A1*   2/2018   Kamijo ............. G02F 1/134309

FOREIGN PATENT DOCUMENTS

CN    105527767    4/2016
TW    201635555    10/2016

OTHER PUBLICATIONS

"Office Action of Taiwan Counterpart Application", dated Aug. 31, 2021, p. 1-p. 3.

* cited by examiner

*Primary Examiner* — Nathanael R Briggs
(74) *Attorney, Agent, or Firm* — JCIPRNET

(57) ABSTRACT

A light control element includes a first substrate, a first electrode, a first liquid crystal layer, a second electrode, a second substrate, a first internal conductive object, a first intermediate conductive object and a second internal conductive object. A peripheral area of the second substrate has a first through hole. The first internal conductive object is disposed in a first through hole of the second substrate. The first intermediate conductive object is disposed between the peripheral area of the second substrate and the first substrate, and is electrically connected to the first electrode and the first internal conductive object. The peripheral area of the second substrate further has a second through hole. The second internal conductive object is disposed in the second through hole of the second substrate and is electrically connected to the second electrode.

20 Claims, 7 Drawing Sheets

TUNABLE LIGHT PROJECTOR AND LIGHT CONTROL ELEMENT

BACKGROUND

Technical Field

The disclosure relates to a tunable light projector and light control element.

Description of Related Art

The tunable light projector integrated in the mobile device is used to generate patterned light, such as structured light or flood light, by a light control element. The patterned light projected by the tunable light projector can be used for face recognition or SLAM (Simultaneous localization and mapping) through 3D image matching. In conventional method, an upper substrate and a lower substrate of the light control element are misaligned or offset to expose a bonding area for electrical connection with an external driving element. The bonding area makes it difficult to reduce an overall area of the light control element.

SUMMARY

The disclosure provides a light control element having a small area of its surface.

The present disclosure provides a tunable light projector including a light control element having a small area.

A light control element of the present disclosure includes a first substrate, a first electrode, a first liquid crystal layer, a second electrode, a second substrate, a first internal conductive object, a first intermediate conductive object and a second internal conductive object. The first substrate, the first electrode, the first liquid crystal layer, the second electrode and the second substrate are arranged sequentially along a direction. The peripheral area of the second substrate has a first through hole, and the first through hole is staggered from the second electrode. The first internal conductive object is disposed in the first through hole of the second substrate. The first intermediate conductive object is disposed between the peripheral area of the second substrate and the first substrate, and is electrically connected to the first electrode and the first internal conductive object. The peripheral area of the second substrate further has a second through hole. The second internal conductive object is disposed in the second through hole of the second substrate and is electrically connected to the second electrode.

A tunable light projector of the present disclosure includes a light source and the light control element. The light source is adapted to emit a light beam. The light control element is disposed in a transmission path of the light beam.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
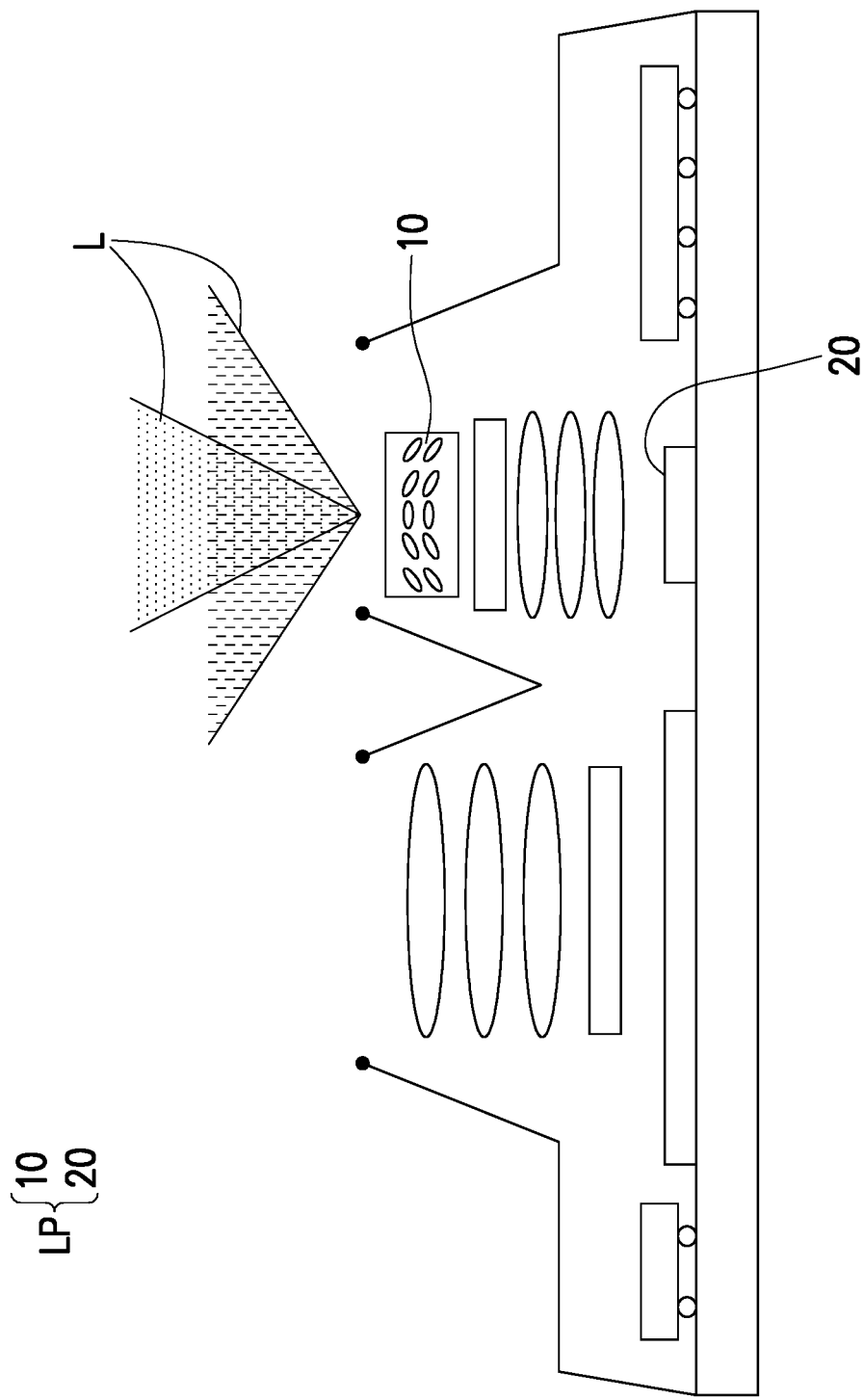
FIG. 1 is a schematic diagram of a tunable light projector LP according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram of a tunable light projector LP according to an embodiment of the disclosure.

Referring to FIG. 1, the tunable light projector LP includes a light control element 10 and a light source 20. The light source 20 is adapted to emit a light beam L. The light control element 10 is disposed in a transmission path of the light beam L. The light control element 10 is adapted to control a light shape of the light beam L. For example, in the embodiment, the light source 20 may be a vertical-cavity surface-emitting laser (VCSEL), but the disclosure is not limited thereto.

Figure 2:
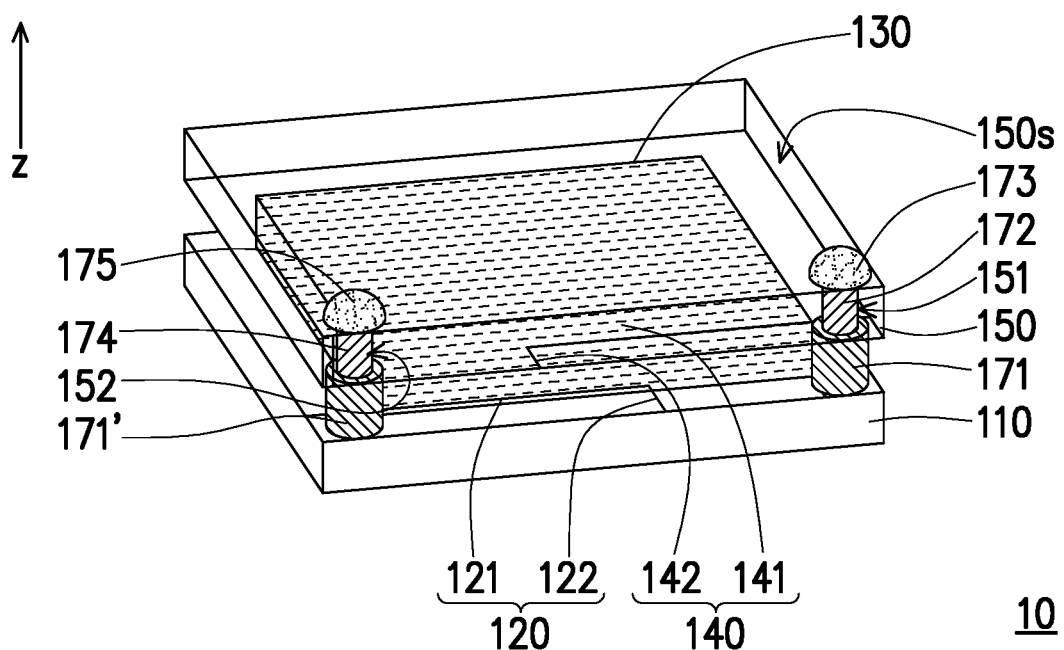
FIG. 2 is a three-dimensional schematic diagram of a light control element 10 according to an embodiment of the disclosure.

FIG. 2 is a three-dimensional schematic diagram of a light control element 10 according to an embodiment of the disclosure. FIG. 2 omits the illustration of the first sealant 160.

Figure 3:
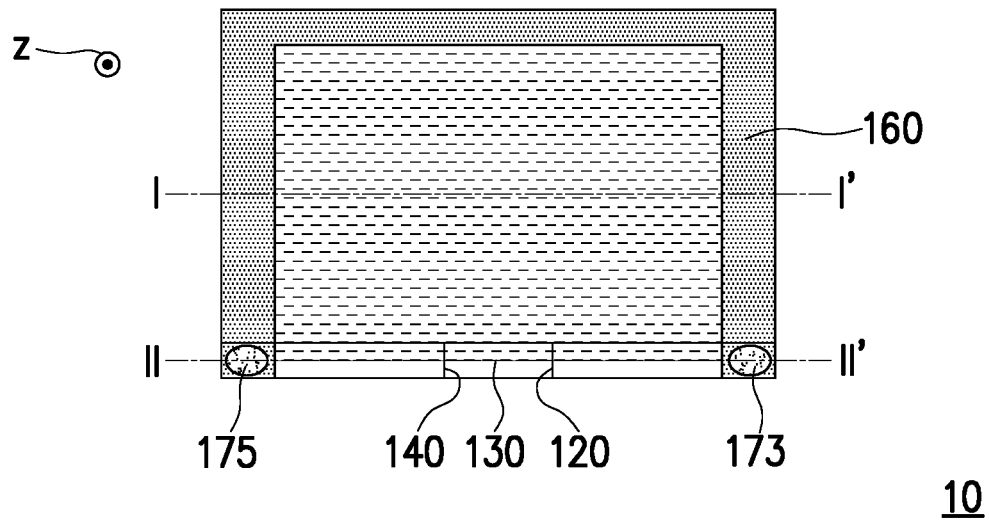
FIG. 3 is a schematic top view of the light control element 10 according to an embodiment of the disclosure.

FIG. 3 is a schematic top view of the light control element 10 according to an embodiment of the disclosure.

Figure 4:
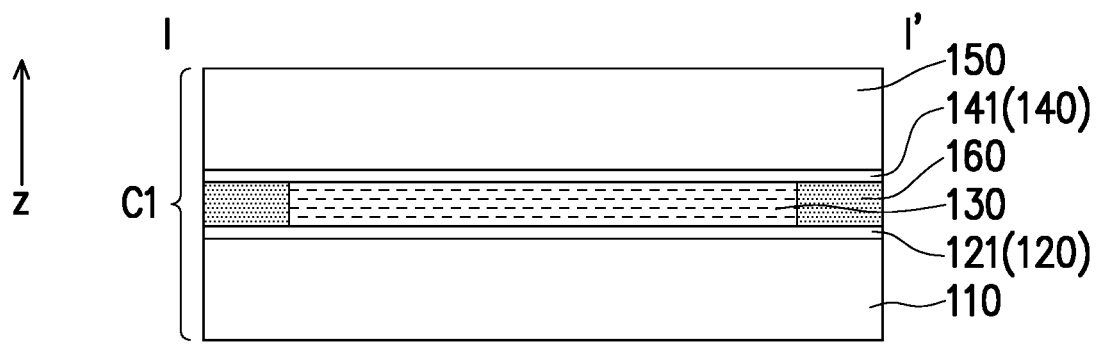
FIG. 4 is a schematic cross-sectional view of the light control element 10 according to an embodiment of the disclosure.

FIG. 4 is a schematic cross-sectional view of the light control element 10 according to an embodiment of the disclosure. FIG. 4 corresponds to the section line I-I' of FIG. 3.

Figure 5:
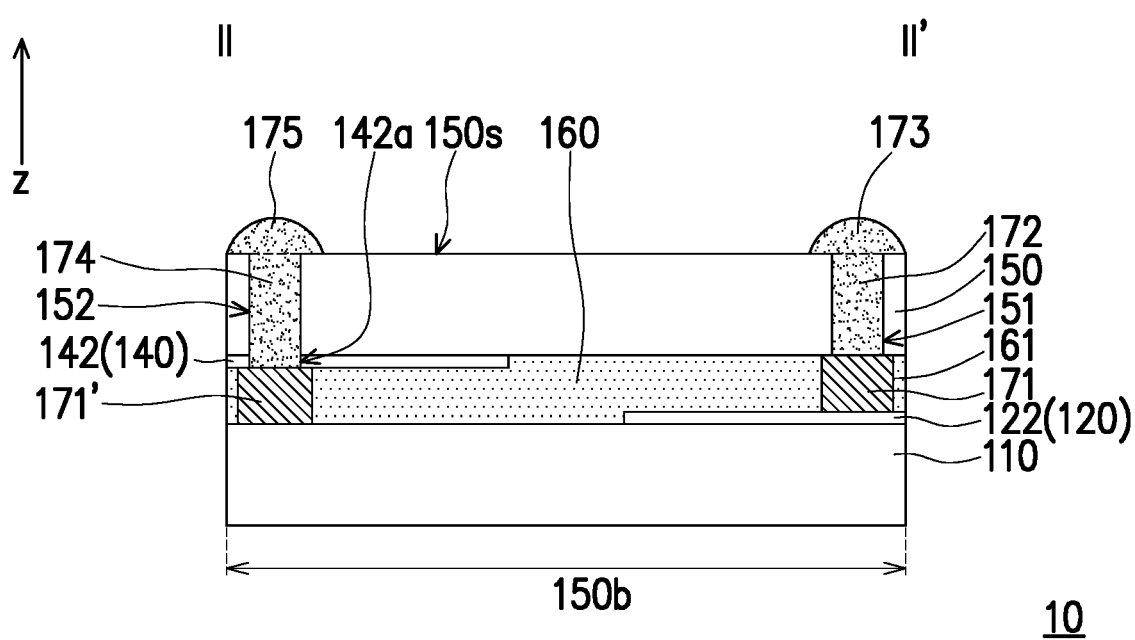
FIG. 5 is a schematic cross-sectional view of the light control element 10 according to an embodiment of the disclosure.

FIG. 5 is a schematic cross-sectional view of the light control element 10 according to an embodiment of the disclosure. FIG. 5 corresponds to the section line II-IF of FIG. 3.

Referring to FIG. 2 to FIG. 5, the light control element 10 includes a first liquid crystal cell C1. The first liquid crystal cell C1 includes a first substrate 110, a first electrode 120, a first liquid crystal layer 130, a second electrode 140 and a second substrate 150 sequentially arranged along the direction z. The first liquid crystal cell C1 further includes a first sealant 160. The first sealant 160 is disposed between the first substrate 110 and the second substrate 150, and surrounds the first liquid crystal layer 130.

The first electrode 120 is disposed on the first substrate 110 and is located between the first liquid crystal layer 130 and the first substrate 110. In the embodiment, the first electrode 120 has a main portion 121 and a connection portion 122, the main portion 121 of the first electrode 120 overlaps the first liquid crystal layer 130, the connection portion 122 of the first electrode 120 is located outside an area of the first liquid crystal layer. 130.

The second electrode 140 is disposed on the second substrate 150, and located between the second substrate 150 and the first liquid crystal layer 130. In the embodiment, the second electrode 140 has a main portion 141 and a connection portion 142, the main portion 141 of the second electrode 140 overlaps the first liquid crystal layer 130, the connection portion 142 of the second electrode 140 is located outside the area of the first liquid crystal layer 130, and the connection portion 122 of the first electrode 120 is staggered from the connection portion 142 of the second electrode 140.

In the embodiment, the first substrate 110 and the second substrate 150 may be selectively light-transmissive substrates; a material of the first substrate 110 is, for example, glass, quartz, organic polymer or other suitable materials; a material od the second substrate 150 is, for example, glass, quartz, organic polymer or other appropriate materials; but the disclosure is not limited to thereto.

In the embodiment, the first electrode 120 and the second electrode 140 can be selectively light-transmissive conductive layers; a material of the first electrode 120 is, for example, indium tin oxide (ITO), antimony tin oxide (ATO) or other material; a material of the second electrode 140 is, for example, indium tin oxide (ITO), antimony tin oxide (ATO) or other material; but the disclosure is not limited to thereto.

The second substrate 150 has a peripheral area 150b outside the area of the first liquid crystal layer 130. The first sealant 160 is disposed between the first substrate 110 and the peripheral area 150b of the second substrate 150. The peripheral area 150b of the second substrate 150 has a first through hole 151. The first through hole 151 and the second electrode 140 are staggered. The first through hole 151 of the second substrate 150 does not overlap the connection portion 142 of the second electrode 140. The first through hole 151 of the second substrate 150 overlaps the connection portion 122 of the first electrode 120.

The first liquid crystal cell C1 further includes a first internal conductive object 172, which is disposed in the first through hole 151 of the second substrate 150. For example, in the embodiment, the first internal conductive object 172 may be a conductive glue (for example, but not limited to: a silver glue). However, the present disclosure is not limited to thereto. In other embodiment, the first internal conductive object 172 may be a conductive object pre-formed in the first through hole 151 (for example, but not limited to: a copper pillar or a copper layer).

The first liquid crystal cell C1 further includes a first intermediate conductive object 171, which is disposed between the peripheral area 150b of the second substrate 150 and the first substrate 110, and is electrically connected to the first electrode 120 and the first internal conductive object 172. For example, in the embodiment, the first intermediate conductive object 171 may be a conductive pillar (such as but not limited to: a gold pillar) or a conductive ball (such as but not limited to: a nickel ball). However, the disclosure is not limited to thereto. In other embodiment, the first intermediate conductive object 171 may be a conductive glue (for example, but not limited to: a silver glue), or a combination of a conductive pillar and a conductive glue.

The second substrate 150 has an outer surface 150s facing away from the first liquid crystal layer 130. In this embodiment, the first liquid crystal cell C1 may selectively include a first external conductive object 173, which is disposed on the outer surface 150s of the second substrate 150 and is electrically connected to the first internal conductive object 172. The first external conductive object 173 can be used as the first contact of the light control element 10, so that the first electrode 120 on the first substrate 110 is able to be electrically connected to an external driving circuit (not shown). For example, in the embodiment, the first external conductive object 173 may be a conductive glue (for example, but not limited to: a silver glue), but the disclosure is not limited to thereto.

In the embodiment, the first sealant 160 has an opening 161 overlapping the first through hole 151 of the second substrate 150. The first intermediate conductive object 171 is disposed in the opening 161 of the first sealant 160. In the embodiment, in the top view of the light control element 10 (i.e. FIG. 3), the first intermediate conductive object 171 may be selectively disposed within the outer contour 160e of the first sealant 160, but this disclosure does not limited to thereto.

The first liquid crystal cell C1 further includes a second internal conductive object 174. The peripheral area 150b of the second substrate 150 further has a second through hole 152. The second internal conductive object 174 is disposed in the second through hole 152 and is electrically connected to the second electrode 140.

For example, in the embodiment, the second electrode 140 may selectively have an opening 142a overlapping the second through hole 152 of the second substrate 150; the first liquid crystal cell C1 further includes an auxiliary conductive object 171' disposed between the second electrode 140 and the first substrate 110, and electrically connected to the second electrode 140; the second internal conductive object 174 may be a conductive glue (such as but not limited to: a silver glue), and the second inner conductive The second internal conductive object 174 may be disposed in the second through hole 152 of the second substrate 150, in the opening 142a of the second electrode 140, and on the auxiliary conductive object 171', so as to be well electrically connected to the second electrode 140. However, the disclosure is not limited to thereto. In other embodiment, the second internal conductive object 174 may be a conductive object (for example, but not limited to: copper pillars or copper layers) pre-formed in the second through hole 152, the second electrode 140 may be directly formed on the second internal conductive object 174, and the second electrode 140 may not have the opening 142a.

In the embodiment, the first liquid crystal cell C1 may selectively include a second external conductive object 175, which is disposed on the outer surface 150s of the second substrate 150 and is electrically connected to the second internal conductive object 174. The second external conductive object 175 can be used as the second contact of the light control element 10, so that the second electrode 140 on the second substrate 150 is able to be electrically connected to an external driving circuit (not shown). For example, in the embodiment, the second external conductive object 175 may be a conductive glue (for example, but not limited to: a silver glue), but the disclosure is not limited to thereto.

It is worth mentioning that, by using the first intermediate conductive object 171, the first internal conductive element 172 and the second internal conductive element 174, the first electrode 120 and the second electrode 140 located inside the light control element 10 are able to be electrically connected to the first contact (i.e. the first external conductive object 173) and the second contact (i.e. the second external conductive object 175) provided on the outer surface 150s of the second substrate 150. The first substrate 110 may not reserve a bonding area staggered from the second substrate 150 for the placement of multiple pads that are electrically connected to the first electrode 120 and the second electrode 140. In this way, the overall area of the light control element 10 can be reduced.

It must be noted here that the following embodiments follow the component numbers and part of the content of the previous embodiments, wherein the same number is used to represent the same or similar components, and the description of the same technical content is omitted.

Figure 6:
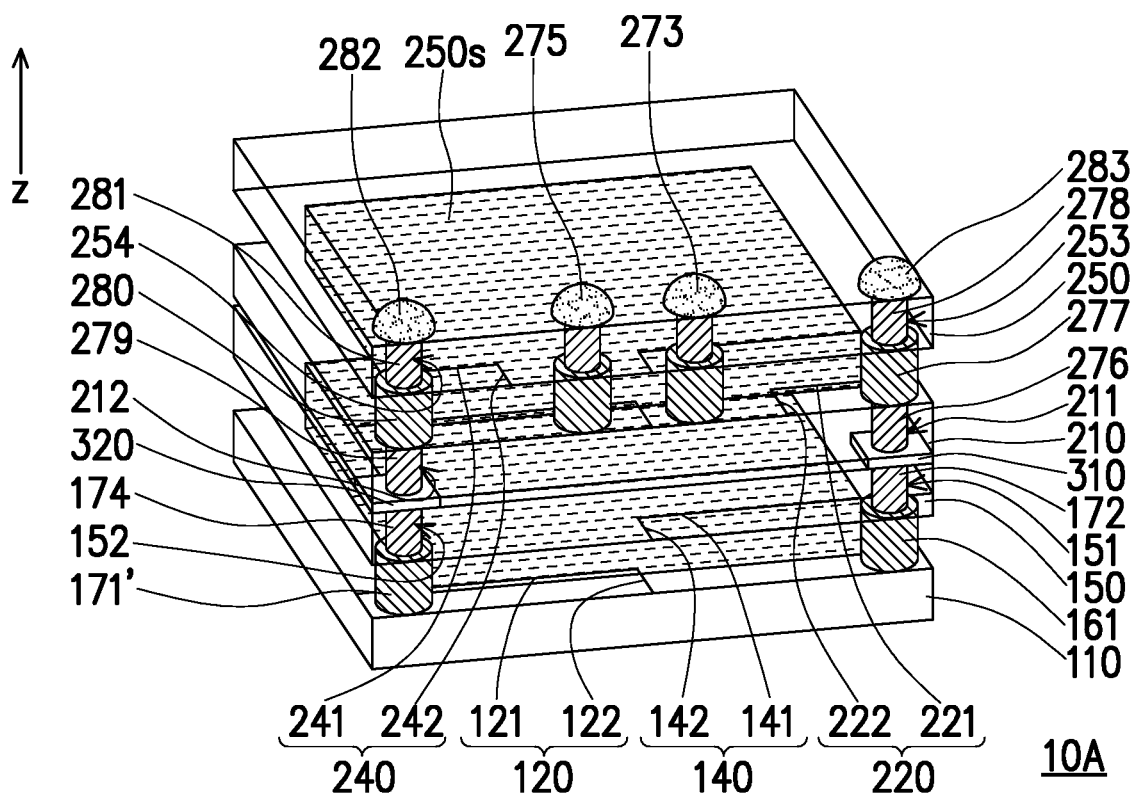
FIG. 6 is a three-dimensional schematic diagram of a light control element 10A according to an embodiment of the disclosure.

FIG. 6 is a three-dimensional schematic diagram of a light control element 10A according to an embodiment of the disclosure. FIG. 6 omits the illustration of the first seal 160 and the second seal 260.

Figure 7:
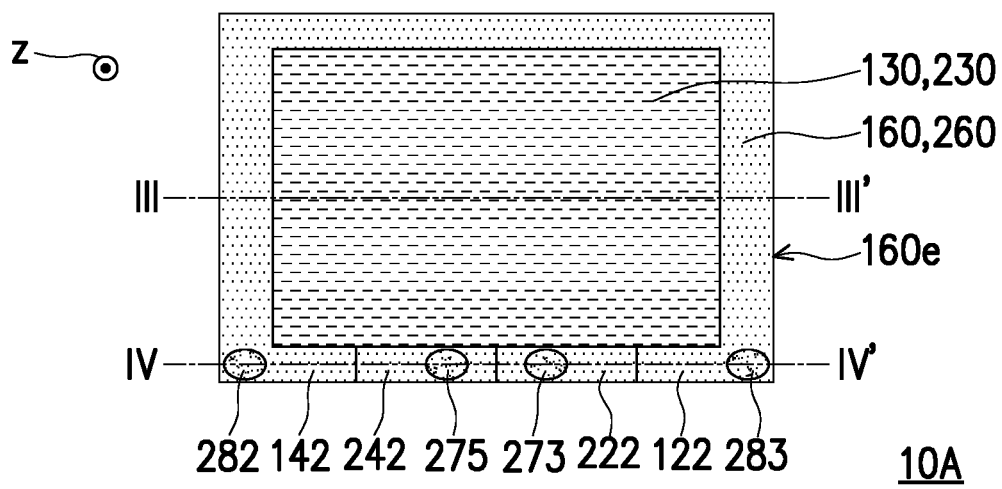
FIG. 7 is a schematic top view of the light control element 10A according to an embodiment of the disclosure.

FIG. 7 is a schematic top view of the light control element 10A according to an embodiment of the disclosure.

Figure 8:
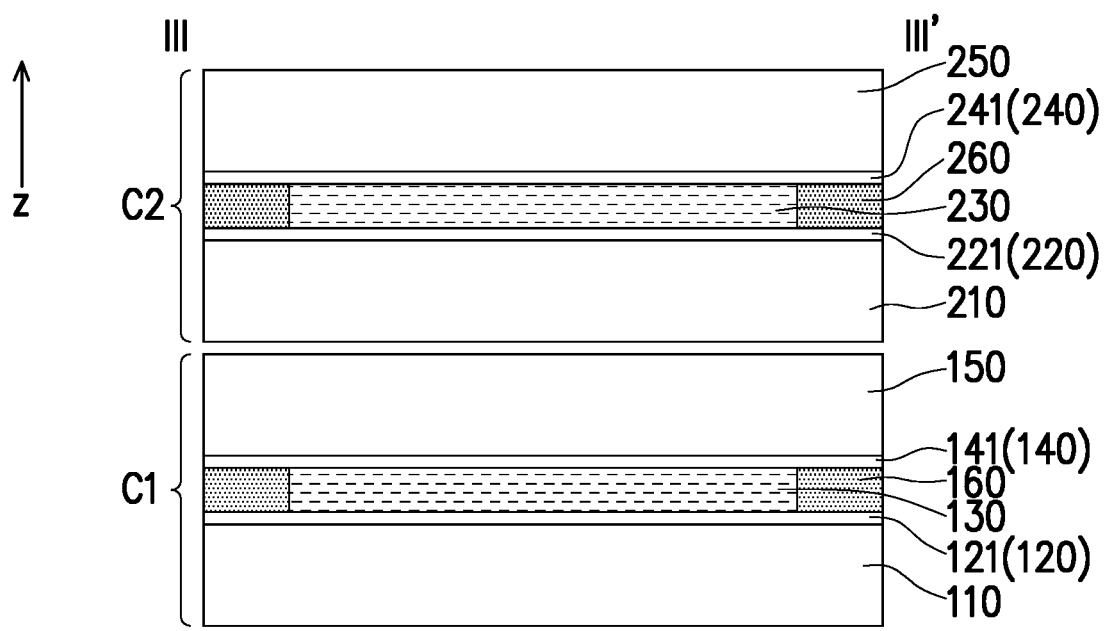
FIG. 8 is a schematic cross-sectional view of the light control element 10A according to an embodiment of the disclosure.

FIG. 8 is a schematic cross-sectional view of the light control element 10A according to an embodiment of the disclosure. FIG. 8 corresponds to the section line III-III' of FIG. 7.

Figure 9:
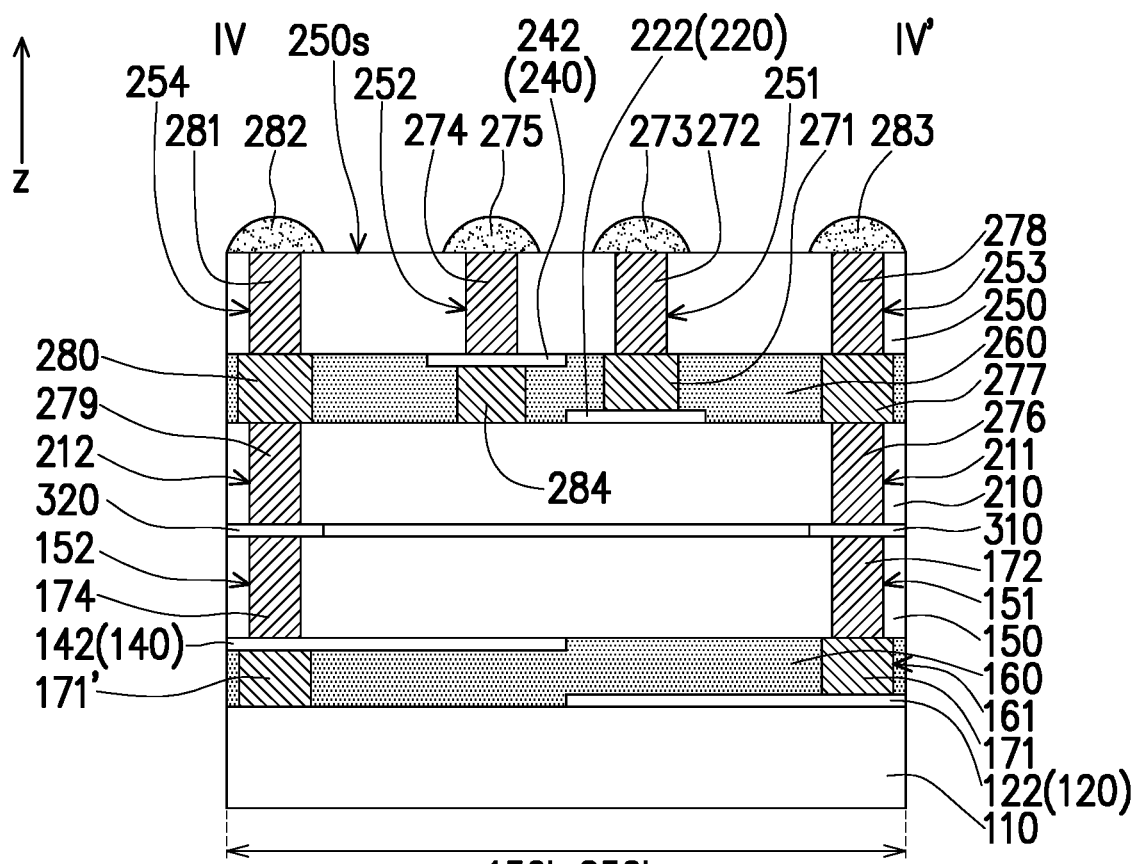
FIG. 9 is a schematic cross-sectional view of the light control element 10A according to an embodiment of the disclosure.

FIG. 9 is a schematic cross-sectional view of the light control element 10A according to an embodiment of the disclosure. FIG. 9 corresponds to the section line IV-IVI' of FIG. 7.

The light control element 10A of the embodiment is similar to the aforementioned light control element 10, the main difference between the two is that the light control element 10A of the embodiment further includes a second liquid crystal cell C2.

Referring to FIG. 6 to FIG. 9, in the embodiment, the light control element 10A further includes a second liquid crystal cell C2, which is disposed on the first liquid crystal cell C1. The second liquid crystal cell C2 includes a third substrate 210, a third electrode 220, a second liquid crystal layer 230, a fourth electrode 240 and a fourth substrate 250, wherein the first substrate 110, the first electrode 120, the first liquid crystal layer 130, the second electrode 140, the second substrate 150, the third substrate 210, the third electrode 220, the second liquid crystal layer 230, the fourth electrode 240 and the fourth substrate 250 are sequentially arranged along the direction z. The second liquid crystal cell C2 further includes a second sealant 260, which is disposed between the third substrate 210 and the fourth substrate 250 and surrounds the second liquid crystal layer 230.

The third electrode 220 is disposed on the third substrate 210 and is located between the second liquid crystal layer 230 and the third substrate 210. In the embodiment, the third electrode 220 has a main portion 221 and a connection portion 222, the main portion 221 of the third electrode 220 overlaps the second liquid crystal layer 230, and the connection portion 222 of the third electrode 220 is located outside an area of the second liquid crystal layer 230.

The fourth electrode 240 is disposed on the fourth substrate 250 and located between the fourth substrate 250 and the second liquid crystal layer 230. In the embodiment, the fourth electrode 240 has a main portion 241 and a connection portion 242, the main portion 241 of the fourth electrode 240 overlaps the second liquid crystal layer 230, the connection portion 242 of the fourth electrode 240 is located outside the area of the second liquid crystal layer 230, and the connection portion 222 of the third electrode 220 is staggered from the connection portion 242 of the fourth electrode 240.

In the embodiment, the third substrate 210 and the fourth substrate 250 can selectively be light-transmissive substrates; a material of the third substrate 210 is, for example, glass, quartz, organic polymer or other suitable material; a material of the fourth substrate 250 is, for example, glass, quartz, organic polymer or other appropriate materials; but this disclosure is not limited to thereto.

In the embodiment, the third electrode 220 and the fourth electrode 240 may be selectively light-transmissive conductive layers; a material of the third electrode 220 is, for example, indium tin oxide (ITO), antimony tin oxide (ATO) or other material; a material of the fourth electrode 240 is, for example, indium tin oxide (ITO), antimony tin oxide (ATO) or other material; but the present disclosure is not limited to thereto.

The fourth substrate 250 has a peripheral region 250b outside the area of the second liquid crystal layer 230. The second sealant 260 is disposed between the third substrate 210 and the peripheral area 250b of the fourth substrate 250. The peripheral area 250b of the fourth substrate 250 has a third through hole 251, and the third through hole 251 is staggered from the fourth electrode 240. The third through hole 251 of the fourth substrate 250 does not overlap the connection portion 242 of the fourth electrode 240. The third through hole 251 of the fourth substrate 250 overlaps the connection portion 222 of the third electrode 220.

The second liquid crystal cell C2 further includes a third internal conductive object 272, which is disposed in the third through hole 251 of the fourth substrate 250. For example, in the embodiment, the third internal conductive object 272 may be a conductive object (for example, but not limited to: a copper pillar or a copper layer) pre-formed in the third through hole 251. However, the disclosure is not limited to thereto. In other embodiments, the third internal conductive object 272 may also be a conductive glue (for example, but not limited to: a silver glue).

The second liquid crystal cell C2 further includes a second intermediate conductive object 271, which is disposed between the third substrate 210 and the peripheral area 250b of the fourth substrate 250, and is electrically connected to the third electrode 220 and the third internal conductive object 272. For example, in the embodiment, the second intermediate conductive object 271 may be a conductive pillar (for example, but not limited to: a gold pillar) or a conductive ball (for example, but not limited to: a nickel ball). However, the disclosure is not limited to thereto. In other embodiment, the second intermediate conductive object 271 may be a conductive glue (for example, but not limited to: a silver glue), or a combination of a conductive pillar and a conductive glue.

The fourth substrate 250 has an outer surface 250s facing away from the second liquid crystal layer 230. In the embodiment, the second liquid crystal cell C2 may selectively include a third external conductive object 273, which is disposed on the outer surface 250s of the fourth substrate 250 and is electrically connected to the third internal conductive object 272. The third external conductive object 273 can be used as a third contact of the light control element 10A, so that the third electrode 220 on the third substrate 210 is able to be electrically connected to an external driving circuit (not shown). For example, in the embodiment, the third external conductive object 273 may be a conductive glue (for example, but not limited to: a silver glue), but the disclosure is not limited to thereto.

In the embodiment, the second sealant 260 has an opening 261 overlapping the third through hole 251 of the fourth substrate 250. In the embodiment, the second intermediate conductive object 271 may be selectively disposed in the opening 261 of the second sealant 260. In the embodiment, in the top view of the light control element 10A (i.e. FIG. 7), the second intermediate conductive object 271 may be selectively disposed within the outer contour 260e of the second sealant 260.

The second liquid crystal cell C2 further includes a fourth internal conductive object 274. The peripheral area 250b of the fourth substrate 250 further has a fourth through hole 252. The fourth internal conductive object 274 is disposed in the fourth through hole 252 of the fourth substrate 250 and is electrically connected to the fourth electrode 240. For example, in the embodiment, the fourth internal conductive object 274 may be a conductive object (for example, but not limited to: a copper pillar or a copper layer) pre-formed in the fourth through hole 252. However, the disclosure is not limited to thereto. In other embodiment, the fourth internal conductive object 274 may be a conductive glue (for example, but not limited to: a silver glue).

In the embodiment, the second liquid crystal cell C2 can further selectively include a fourth external conductive object 275, which is disposed on the outer surface 250s of the fourth substrate 250 and is electrically connected to the fourth internal conductive object 274. The fourth external conductive object 275 can be used as a fourth contact of the light control element 10A, so that the fourth electrode 240 on the fourth substrate 250 is able to be electrically connected to an external driving circuit (not shown). For example, in the embodiment, the fourth external conductive object 275 may be a conductive glue (for example, but not limited to: a silver glue), but the disclosure is not limited to thereto.

In the embodiment, the third substrate 210 has a fifth through hole 211; the second liquid crystal cell C2 further includes a fifth internal conductive object 276, which is disposed in the fifth through hole 211 of the third substrate 210 and is electrically connected to the first internal conductor 172. For example, in the embodiment, the light control element 10A may selectively include a first interposing pattern 310, which is disposed between the third substrate 210 and the second substrate 150 to electrically connect the fifth internal conductive object 276 and the first internal conductive object 172. The first interposing pattern 310 enables the fifth internal conductive object 276 to be electrically connected to the first internal conductive object 172. However, the disclosure is not limited to thereto. In other embodiment, the arrangement of the first interposing pattern 310 may be omitted, and other methods are used to make the fifth internal conductive object 276 electrically connected to the first internal conductive object 172 well.

For example, in the embodiment, the fifth internal conductive object 276 may be a conductive object (for example, but not limited to: a copper pillar or a copper layer) pre-formed in the fifth through hole 211. However, the disclosure is not limited to thereto. In other embodiment, the fifth internal conductive object 276 may also be a conductive glue (for example, but not limited to: a silver glue).

In the embodiment, the fourth substrate 250 has a sixth through hole 253; the second liquid crystal cell C2 further includes a sixth internal conductive object 278, which is disposed in the sixth through hole 253 of the fourth substrate 250; the second liquid crystal cell C2 further includes a third intermediate conductive object 277, which is disposed between the peripheral area 250b of the fourth substrate 250 and the third substrate 210, and is electrically connected to the fifth internal conductive object 276 and the sixth internal conductive object 278. The third electrode 220 is staggered from the fifth internal conductive object 276, the third intermediate conductive object 277 and the sixth internal conductive object 278, and the fourth electrode 240 is staggered from the fifth internal conductive object 276, the third intermediate conductive object 277 and the sixth internal conductive objects 278.

For example, in the embodiment, the sixth internal conductive object 278 may be a conductive object (such as but not limited to: a copper pillars or a copper layer) pre-formed in the sixth through hole 253. However, the disclosure is not limited to thereto. In other embodiment, the sixth internal conductive object 278 may be a conductive glue (for example, but not limited to: a silver glue).

For example, in the embodiment, the third intermediate conductive object 277 may be a conductive pillar (such as but not limited to: a gold pillar) or a conductive ball (such as but not limited to: a nickel ball). However, the disclosure is not limited to thereto. In other embodiment, the third intermediate conductive object 277 may also be a conductive glue (for example, but not limited to: a silver glue), or a combination of a conductive pillar and a conductive glue.

In the embodiment, the second liquid crystal cell C2 may selectively include a first external conductive object 283, which is disposed on the outer surface 250s of the fourth substrate 250 and is electrically connected to the sixth internal conductive object 278. The first outer conductive object 283 is electrically connected to the first electrode 120 through the sixth internal conductive object 278, the third intermediate conductive object 277, the fifth internal conductive object 276, the first internal conductive object 172 and the first intermediate conductive object 171. The first external conductive object 283 can be used as a first contact of the light control element 10A, so that the first electrode 120 on the first substrate 110 is able to be electrically connected to an external driving circuit (not shown). For example, in the embodiment, the first external conductive object 283 may be a conductive glue (for example, but not limited to: a silver glue), but the disclosure is not limited to thereto.

In the embodiment, the third substrate 210 has a seventh through hole 212 that overlaps the second through hole 152 of the second substrate 150; the fourth substrate 250 has an eighth through hole 254 that overlaps the seventh through hole 212 of the third substrate 210; the second liquid crystal cell C2 further includes a seventh internal conductive object 279, an eighth internal conductive object 281 and a fourth intermediate conductive object 280; the seventh internal conductive object 279 is disposed in the seventh through hole 212 of the third substrate 210 and electrically connected to the second internal conductive object 174; the eighth internal conductive object 281 is disposed in the eighth through hole 254 of the fourth substrate 250; the fourth intermediate conductive object 280 is disposed between the peripheral area 250b of the fourth substrate 250 and the third substrate 210, and electrically connected to the seventh internal conductive object 279 and the eighth internal conductive object 281.

For example, in the embodiment, the seventh internal conductive object 279 may be a conductive object (such as but not limited to: a copper pillars or s copper layers)

pre-formed in the seventh through hole 212. However, the disclosure is not limited to this. In other embodiment, the seventh internal conductive object 279 may be a conductive glue (for example, but not limited to: a silver glue).

For example, in the embodiment, the fourth intermediate conductive object 280 may be a conductive pillar (for example, but not limited to: a gold pillar) or a conductive ball (for example, but not limited to: a nickel ball). However, the disclosure is not limited to thereto. In other embodiment, the third intermediate conductive object 277 may be a conductive glue (for example, but not limited to: a silver glue), or a combination of a conductive pillar and a conductive glue.

For example, in the embodiment, the eighth internal conductive object 281 may be a conductive object (for example, but not limited to: a copper pillar or a copper layer) pre-formed in the seventh through hole 212. However, the disclosure is not limited to thereto. In other embodiment, the eighth internal conductive object 281 may be a conductive glue (for example, but not limited to: a silver glue).

In the embodiment, the second liquid crystal cell C2 may selectively include a second external conductive object 282, which is disposed on the outer surface 250s of the fourth substrate 250 and is electrically connected to the eighth internal conductive object 281. The second outer conductive object 282 is electrically connected to the second electrode 140 through the eighth internal conductive object 281, the third intermediate conductive object 277, the seventh internal conductive object 279 and the second internal conductive object 174. The second external conductive object 282 can be used as a second contact of the light control element 10A, so that the second electrode 140 on the second substrate 150 is able to be electrically connected to an external driving circuit (not shown). For example, in the embodiment, the second external conductive object 282 may be a conductive glue (for example, but not limited to: a silver glue), but the disclosure is not limited to thereto.

In the embodiment, the light control element 10A may selectively include a second interposing pattern 320, which is disposed between the third substrate 210 and the second substrate 150 to electrically connect the seventh internal conductive object 279 and the second internal conductor 174. The second interposing pattern 320 enables the seventh internal conductive object 279 to be electrically connected to the second internal conductive object 174 well. However, the disclosure is not limited to thereto. In other embodiment, the arrangement of the second interposing pattern 320 may be omitted, and other methods are used to make the seventh internal conductive object 279 electrically connected to the second internal conductive object 174 well.

In addition, in the embodiment, the second liquid crystal cell C2 may selectively include an auxiliary conductive object 284 disposed between the fourth electrode 240 and the third substrate 210, and electrically connected to the fourth electrode 240. The auxiliary conductive object 284 and the second intermediate conductive object 271 may be arranged symmetrically, so that the stress is uniformly distributed during the assembly process of the second liquid crystal cell C2, which helps to improve the manufacturing yield of the light control element 10A. However, the disclosure is not limited to thereto, in other embodiment, the auxiliary conductive object 284 may also be omitted.

Similarly, in the embodiment, the first liquid crystal cell C1 may selectively include an auxiliary conductive object 171' disposed between the second electrode 140 and the first substrate 110, and electrically connected to the second electrode 140. The auxiliary conductive object 171' and the first intermediate conductive object 171 may be arranged symmetrically, so that the stress is uniformly distributed during the assembly process of the first liquid crystal cell C1, which helps to improve the manufacturing yield of the light control element 10A. However, the disclosure is not limited to thereto, in other embodiment, the auxiliary conductive object 171' may be omitted.

Figure 10:
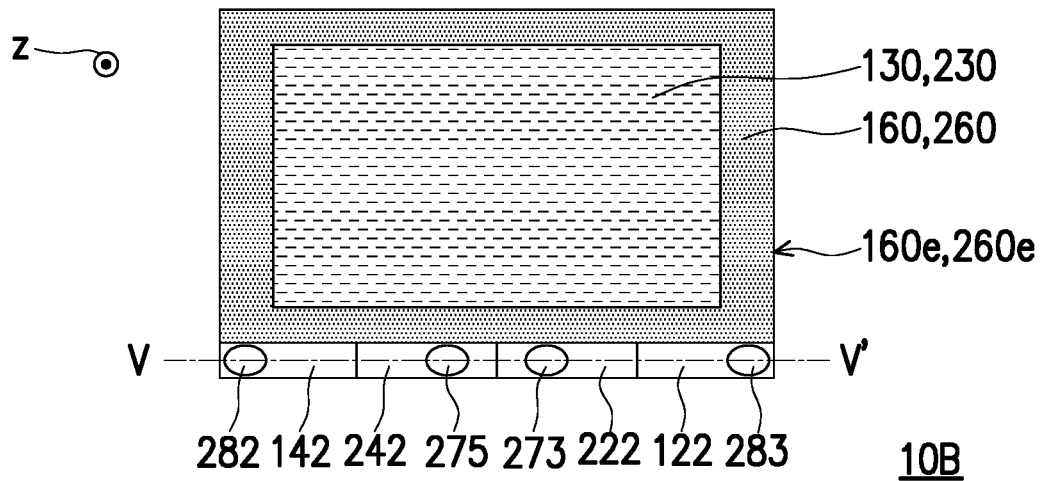
FIG. 10 is a schematic top view of a light control element 10B according to an embodiment of the disclosure.

FIG. 10 is a schematic top view of a light control element 10B according to an embodiment of the disclosure.

Figure 11:
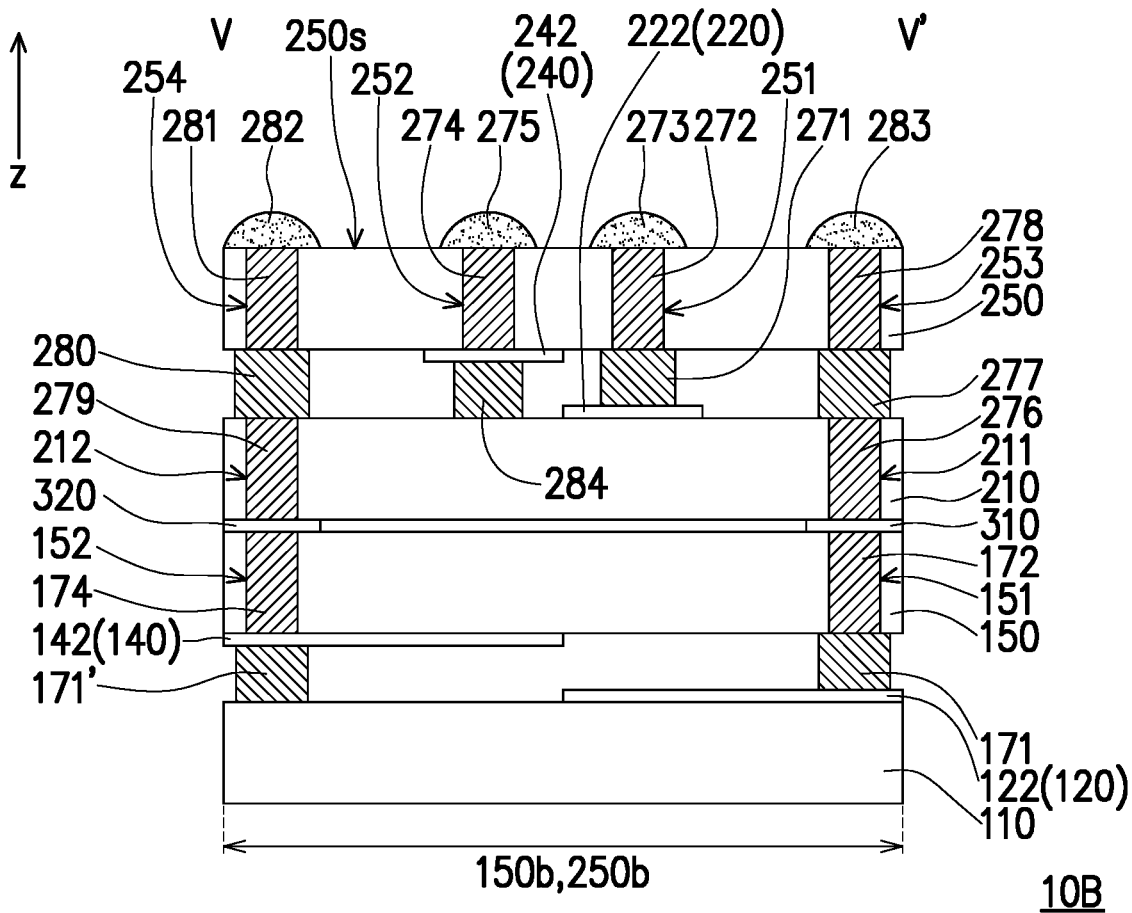
FIG. 11 is a schematic cross-sectional view of the light control element 10B according to an embodiment of the disclosure.

FIG. 11 is a schematic cross-sectional view of the light control element 10B according to an embodiment of the disclosure. FIG. 11 corresponds to the section line V-V' of FIG. 10.

The light control element 10B of FIG. 10 and FIG. 11 is similar to the light control element 10A of FIG. 7 and FIG. 9, and the differences between the two are explained below.

In the embodiment of FIG. 7 and FIG. 9, the auxiliary conductive object 171', the first intermediate conductive object 171, the second internal conductive object 174 and the first inner conductive element 172 may be disposed within the outer contour 160e of the first sealant 160, and the seventh internal conductive object 279, the fifth internal conductive object 276, the fourth intermediate conductive object 280, the third intermediate conductive object 277, the auxiliary conductive object 284, the second intermediate conductive object 271, the eighth internal conductive object 281, the fourth internal conductive object 274, the third internal conductive object 272 and the sixth internal conductive object 278 may be disposed within the outer contour 260e of the second sealant 260.

In the embodiment of FIG. 10 and FIG. 11, in the top view of the light control element 10B, the auxiliary conductive object 171', the first intermediate conductive object 171, the second internal conductive object 174 and the first internal conductive element 172 may be disposed outside the outer contour 160e of the sealant 160, and the seventh internal conductive object 279, the fifth internal conductive object 276, the fourth intermediate conductive object 280, the third intermediate conductive object 277, the auxiliary conductive object 284, the second intermediate conductive object 271, the eighth internal conductive object 281, the fourth internal conductive object 274, the third internal conductive object 272 and the sixth internal conductive object 278 may be disposed outside the outer contour 260e of the second sealant 260.

Figure 12:
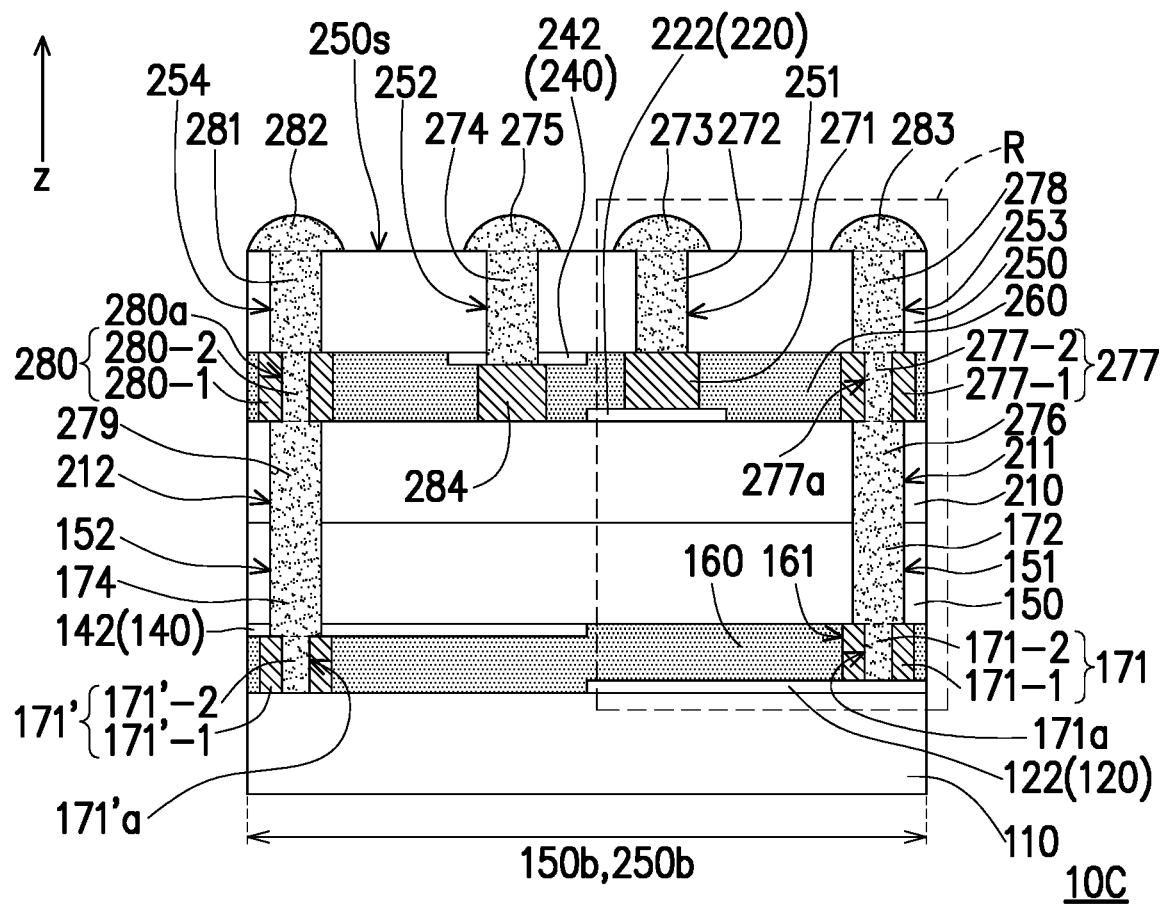
FIG. 12 is a schematic cross-sectional view of a light control element 10C according to an embodiment of the disclosure.

FIG. 12 is a schematic cross-sectional view of a light control element 10C according to an embodiment of the disclosure.

Figure 13:
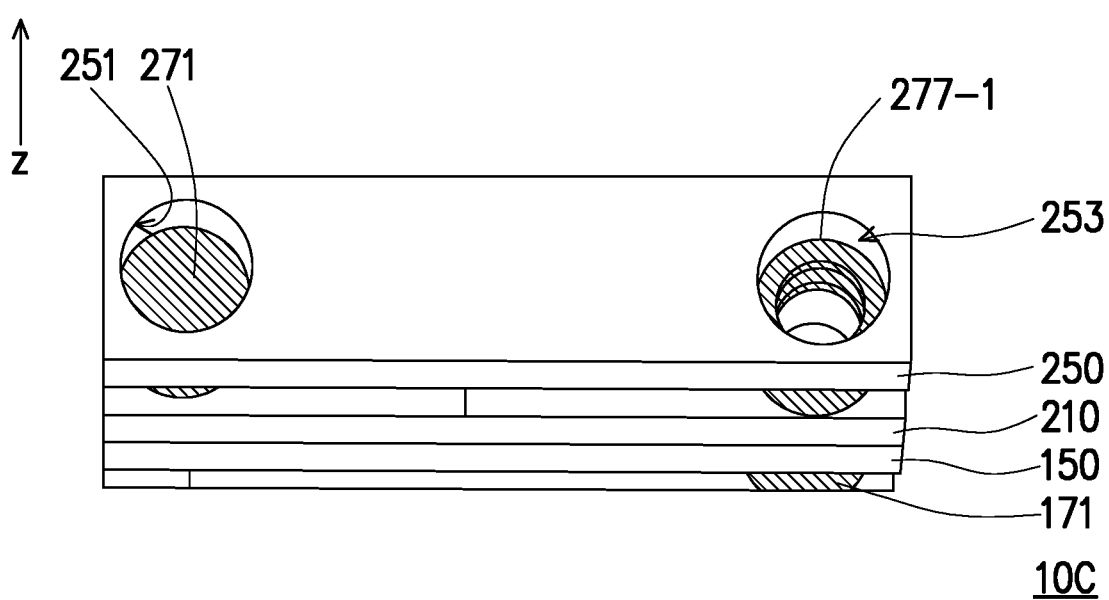
FIG. 13 is a three-dimensional schematic diagram of the part of a light control element 10C according to an embodiment of the disclosure.

FIG. 13 is a three-dimensional schematic diagram of the part of a light control element 10C according to an embodiment of the disclosure. FIG. 13 corresponds to area R in FIG. 12. FIG. 13 omits the first seal 160 and second seal 260 of FIG. 12.

The light control element 10C of FIGS. 12 and 13 is similar to the light control element 10A of FIGS. 7 and 9, and the differences between the two are described below.

Referring to FIG. 12 and FIG. 13, in the embodiment, the first intermediate conductive object 171 may selectively include a first portion 171-1 and a second portion 171-2, the first portion 171-1 has a through hole 171a, and the second portion 171-2 is disposed in the through hole 171a of the first portion 171-1. For example, in the embodiment, the first portion 171-1 of the first intermediate conductive object 171 is a conductive pillar (for example, but not limited to: a copper pillar) having a through hole 171a, and the second portion 171-2 the first intermediate conductive object 171 is conductive glue (such as but not limited to: a silver glue) disposed in the through hole 171a.

In the embodiment, the auxiliary conductive object 171' may selectively include a first portion 171'-1 and a second portion 171'-2, the first portion 171'-1 has a through hole 171'a, and the second portion 171'-2 is disposed in the through hole 171'a of the first portion 171'-1. For example, in the embodiment, the first portion 171'-1 of the auxiliary conductive object 171' is a conductive pillar (for example, but not limited to: a copper pillar) having a through hole 171'a, and the second portion 171'-2 of the auxiliary conductive object 171' is a conductive glue (for example, but not limited to: a silver glue) disposed in the through hole 171'a.

In the embodiment, the first inner conductive element 172 may be a conductive glue (for example, but not limited to: a silver glue); the second internal conductive object 174 may be a conductive glue (for example, but not limited to: a silver glue); the seventh internal conductive object 279 may be a conductive glue (for example, but not limited to: a silver glue); the fifth internal conductive object 276 may be a conductive glue (for example, but not limited to: a silver glue).

In the embodiment, the third intermediate conductive object 277 may selectively include a first portion 277-1 and a second portion 277-2, the first portion 277-1 has a through hole 277a, and the second portion 277-2 is disposed in the through hole 277a of the first portion 277-1. For example, in the embodiment, the first portion 277-1 of the third intermediate conductive object 277 is a conductive pillar (for example, but not limited to: a copper pillar) having the through hole 277a, and the second part 277-2 of the third intermediate conductive object 277 is a conductive glue (such as but not limited to: a silver glue) disposed in the through hole 277a.

In the embodiment, the fourth intermediate conductive object 280 may selectively include a first portion 280-1 and a second portion 280-2, the first portion 280-1 has a through hole 280a, and the second portion 280-2 is disposed in the through hole 280a of the first portion 280-1. For example, in the embodiment, the first portion 280-1 of the fourth intermediate conductive object 280 is a conductive pillar (for example, but not limited to: a copper pillar) having a through hole 280a, and the second portion 280-2 of the fourth intermediate conductive object 280 is a conductive glue (for example, but not limited to: a silver glue) disposed in the through hole 280a.

In this embodiment, the eighth internal conductive object 281 may be a conductive glue (for example, but not limited to: a silver glue); the fourth inner conductive body 274 may be a conductive glue (for example, but not limited to: a silver glue); the third internal conductive object 272 may be a conductive glue (for example, but not limited to: a silver glue); the sixth internal conductive object 278 may be a conductive glue (for example, but not limited to: a silver glue).

In the manufacturing process of the light control element 10C of the embodiment, a conductive glue (such as but not limited to: a silver glue) is filled in the through hole 171a of the first intermediate conductive object 171, the first through hole 151 of the second substrate 150, and the fifth through hole 211 of the third substrate 210, the through hole 277a of the third intermediate conductive object 277 and the sixth through hole 253 of the fourth substrate 250, and is formed on the outer surface 250s of the fourth substrate 250, so as to form the second portion 171-2 of the first intermediate conductive object 171, the first internal conductive element 172, the fifth internal conductive object 276, the second portion 277-2 of the third intermediate conductive object 277, the sixth internal conductive object 278, and the first external conductive object 283. Therefore, in the embodiment, a material of the second portion 171-2 of the first intermediate conductive object 171, a material of the first internal conductive element 172, a material of the fifth internal conductive object 276, a material of the second portion 277-2 of the third intermediate conductive object 277, a material of the sixth internal conductive object 278 and a material of the first outer conductive object 283 are the same.

Similarly, in the manufacturing process of the light control element 10C of the embodiment, a conductive glue (such as but not limited to: a silver glue) is filled in the through holes 171'a of the auxiliary conductive objects 171', the second through hole 152 of the second substrate 150, the fifth through hole 211 of the third substrate 210, the through hole 280a of the fourth intermediate conductive object 280 and the eighth through hole 254 of the fourth substrate 250, and is formed the outer surface 250s of the fourth substrate 250, so as to form the second portion 171'-2 of the auxiliary conductive object 171', the second internal conductive object 174, the seventh internal conductive object 279, the second portion 280-2 of the fourth intermediate conductive object 280, the eighth internal conductive object 281 and the second external conductive object 282. Therefore, in the embodiment, a material of the second portion 171'-2 of the auxiliary conductive object 171', a material of the second internal conductive object 174, a material of the seventh internal conductive object 279, a material of the second portion 280-2 of the fourth intermediate conductive object 280, a material of the eighth internal conductive object 281 and a material of the second outer conductive object 282 are the same.

What is claimed is:

1. A tunable light projector, comprising:
   a light source adapted to emit a light beam; and
   a light control element disposed in a transmission path of the light beam, wherein the light control element comprises:
      a first substrate;
      a first electrode;
      a first liquid crystal layer;
      a second electrode;
      a second substrate, wherein the first substrate, the first electrode, the first liquid crystal layer, the second electrode and the second substrate are arranged sequentially along a direction, the second electrode is disposed between the second substrate and the first liquid crystal layer, the second substrate has a peripheral area outside an area of the first liquid crystal layer, the peripheral area of the second substrate has a first through hole, and the first through hole is staggered from the second electrode;
      a first internal conductive object disposed in the first through hole of the second substrate, wherein the first internal conductive object and the second electrode are separated from each other;
      a first intermediate conductive object, disposed between the peripheral area of the second substrate and the first substrate, and electrically connected to the first electrode and the first internal conductive object; and
      a second internal conductive object, wherein the peripheral area of the second substrate further has a second through hole, and the second internal conductive object is disposed in the second through hole of the second substrate and is electrically connected to the second electrode.

2. The tunable light projector according to claim 1, wherein the light control element further comprises:
   a third substrate;
   a third electrode;
   a second liquid crystal layer;
   a fourth electrode;
   a fourth substrate, wherein the first substrate, the first electrode, the first liquid crystal layer, the second electrode, the second substrate, the third substrate, the third electrode, the second liquid crystal layer, the fourth electrode and the fourth substrate are sequentially arranged along the direction, the fourth substrate has a peripheral area outside an area of the second liquid crystal layer, the peripheral area of the fourth substrate has a third through hole, and the third through hole is staggered with the fourth electrode;
   a third internal conductive object disposed in the third through hole of the fourth substrate; and
   a second intermediate conductive object disposed between the third substrate and the peripheral area of the fourth substrate, and electrically connected to the third electrode and the third internal conductive object.

3. The tunable light projector according to claim 2, wherein the peripheral area of the fourth substrate further has a fourth through hole, and the light control element further comprises:
   a fourth internal conductive object disposed in the fourth through hole of the fourth substrate and electrically connected to the fourth electrode.

4. The tunable light projector according to claim 2, wherein the third substrate has a fifth through hole; the fourth substrate has a sixth through hole; the light control element further comprises:
   a fifth internal conductive object, disposed in the fifth through hole of the third substrate, and electrically connected to the first internal conductive object;
   a sixth internal conductive object disposed in the sixth through hole of the fourth substrate; and
   a third intermediate conductive object disposed between the peripheral area of the fourth substrate and the third substrate, and electrically connected to the fifth internal conductive object and the sixth internal conductive object.

5. The tunable light projector according to claim 4, wherein the third electrode is staggered from the fifth internal conductive object, the sixth internal conductive object and the third intermediate conductive object, and the fourth electrode is staggered from the fifth internal conductive object, the sixth internal conductive object and the third intermediate conductive object.

6. The tunable light projector according to claim 4, wherein the third substrate has a seventh through hole; the fourth substrate has an eighth through hole; the light control element further comprises:
   a seventh internal conductive object disposed in the seventh through hole of the third substrate, and electrically connected to the second internal conductive object;
   an eighth internal conductive object disposed in the eighth through hole of the fourth substrate; and
   a fourth intermediate conductive object disposed between the peripheral area of the fourth substrate and the third substrate, and electrically connected to the seventh internal conductive object and the eighth internal conductive object.

7. The tunable light projector according to claim 6, wherein the light control element further comprises:
   a first interposing pattern disposed between the third substrate and the second substrate to electrically connect the fifth internal conductive object and the first internal conductive object.

8. The tunable light projector according to claim 6, wherein the light control element further comprises:
   a second interposing pattern, disposed between the third substrate and the second substrate to electrically connect the seventh internal conductive object and the second internal conductive object.

9. The tunable light projector according to claim 1, wherein the light control element further comprises:
   a first sealant disposed between the first substrate and the peripheral area of the second substrate, wherein the first liquid crystal layer is disposed within a space enclosed by the first sealant;
   the first sealant has an opening, the first through hole of the second substrate overlaps the opening of the first sealant, and the first intermediate conductive object is disposed in the opening of the first sealant.

10. The tunable light projector according to claim 9, wherein a material of the first internal conductive object and a material of at least one portion of the first intermediate conductive object are the same.

11. A light control element, comprising:
    a first substrate;
    a first electrode;
    a first liquid crystal layer;
    a second electrode;
    a second substrate, wherein the first substrate, the first electrode, the first liquid crystal layer, the second electrode and the second substrate are arranged sequentially along a direction, the second electrode is disposed between the second substrate and the first liquid crystal layer, the second substrate has a peripheral area outside an area of the first liquid crystal layer, the peripheral area of the second substrate has a first through hole, and the first through hole is staggered from the second electrode;
    a first internal conductive object disposed in the first through hole of the second substrate, wherein the first internal conductive object and the second electrode are separated from each other;
    a first intermediate conductive object, disposed between the peripheral area of the second substrate and the first substrate, and electrically connected to the first electrode and the first internal conductive object; and
    a second internal conductive object, wherein the peripheral area of the second substrate further has a second through hole, and the second internal conductive object is disposed in the second through hole of the second substrate and is electrically connected to the second electrode.

12. The light control element according to claim 11, further comprising:
    a third substrate;
    a third electrode;
    a second liquid crystal layer;
    a fourth electrode;
    a fourth substrate, wherein the first substrate, the first electrode, the first liquid crystal layer, the second electrode, the second substrate, the third substrate, the third electrode, the second liquid crystal layer, the fourth electrode and the fourth substrate are sequentially arranged along the direction, the fourth substrate has a peripheral area outside an area of the second liquid crystal layer, the peripheral area of the fourth substrate has a third through hole, and the third through hole is staggered with the fourth electrode;
a third internal conductive object disposed in the third through hole of the fourth substrate; and
a second intermediate conductive object disposed between the third substrate and the peripheral area of the fourth substrate, and electrically connected to the third electrode and the third internal conductive object.

13. The light control element according to claim 12, wherein the peripheral area of the fourth substrate further has a fourth through hole, and the light control element further comprises:
a fourth internal conductive object disposed in the fourth through hole of the fourth substrate and electrically connected to the fourth electrode.

14. The light control element according to claim 12, wherein the third substrate has a fifth through hole; the fourth substrate has a sixth through hole; the light control element further comprises:
a fifth internal conductive object, disposed in the fifth through hole of the third substrate, and electrically connected to the first internal conductive object;
a sixth internal conductive object disposed in the sixth through hole of the fourth substrate; and
a third intermediate conductive object disposed between the peripheral area of the fourth substrate and the third substrate, and electrically connected to the fifth internal conductive object and the sixth internal conductive object.

15. The light control element according to claim 14, wherein the third electrode is staggered from the fifth internal conductive object, the sixth internal conductive object and the third intermediate conductive object, and the fourth electrode is staggered from the fifth internal conductive object, the sixth internal conductive object and the third intermediate conductive object.

16. The light control element according to claim 14, wherein the third substrate has a seventh through hole; the fourth substrate has an eighth through hole; the light control element further comprises:
a seventh internal conductive object disposed in the seventh through hole of the third substrate, and electrically connected to the second internal conductive object;
an eighth internal conductive object disposed in the eighth through hole of the fourth substrate; and
a fourth intermediate conductive object disposed between the peripheral area of the fourth substrate and the third substrate, and electrically connected to the seventh internal conductive object and the eighth internal conductive object.

17. The light control element according to claim 16, further comprising:
a first interposing pattern disposed between the third substrate and the second substrate to electrically connect the fifth internal conductive object and the first internal conductive object.

18. The light control element according to claim 16, further comprising:
a second interposing pattern, disposed between the third substrate and the second substrate to electrically connect the seventh internal conductive object and the second internal conductive object.

19. The light control element according to claim 11, further comprising:
a first sealant disposed between the first substrate and the peripheral area of the second substrate, wherein the first liquid crystal layer is disposed within a space enclosed by the first sealant;
the first sealant has an opening, the first through hole of the second substrate overlaps the opening of the first sealant, and the first intermediate conductive object is disposed in the opening of the first sealant.

20. The light control element according to claim 19, wherein a material of the first internal conductive object and a material of at least one portion of the first intermediate conductive object are the same.

* * * * *